United States Patent
Awazu et al.

[15] 3,673,103
[45] June 27, 1972

[54] YTTRIUM ORTHOPHOSPHATE PHOSPHOR

[72] Inventors: Kenzo Awazu; Kazu Matsunaga; Katsutoshi Muto; Junjiro Kai; Kyoko Oi, all of Amagasaki-shi, Hyogo, Japan

[73] Assignee: Mitsubishi Denki Kabushiki Kaisha, Tokyo, Japan

[22] Filed: Aug. 29, 1969

[21] Appl. No.: 854,187

[30] Foreign Application Priority Data

Aug. 31, 1968 Japan..................................43/62441

[52] U.S. Cl............................................252/301.1 L, 23/345
[51] Int. Cl. .........................................................C09k 3/00
[58] Field of Search ................23/345; 252/301.1 R, 301.1 L

[56] References Cited

UNITED STATES PATENTS 3,314,893 4/1967 Hoffman..........................252/301.1 X
3,351,436 11/1967 Sarver......................................23/345

*Primary Examiner*—Leland A. Sebastian
*Attorney*—Sughrue, Rothwell, Mion, Zinn & Macpeak

[57] ABSTRACT

A phosphor consisting of yttrium phosphate as a matrix and cerium and thorium as an activator, represented by the general formula $Y1_{-x-4/3y}Ce_xTh_yPO_4$ wherein $x$ is 0.01–0.1 mol and $y$ is 0.0002–0.05 mol. This phosphor gives a particularly strong luminescence in the near UV wavelength zone of 330–370 millimicrons, and has a light output about 1.5 times as high as a lead-activated barium disilicate ($BaSi_2O_5$:Pb), the light output decrease during light production being markedly small.

7 Claims, 2 Drawing Figures

INVENTORS
KENZO AWAZU,
KAZU MATSUNAGA,
KATSUTOSHI MUTO,
KYOKO OI,
JUNJIRO KAI

BY Sughrue, Rothwell, Mion, Zinn & Macpeak

ATTORNEYS

3,673,103

YTTRIUM ORTHOPHOSPHATE PHOSPHOR

BACKGROUND OF THE INVENTION

1. Field of the Invention

This invention relates to a yttrium orthophosphate phosphor activated with cerium and thorium which gives strong luminescence in the near UV wavelength zone of 330–370 millimicrons.

2. Description of the Prior Art

Up to the present time, a number of varieties of phosphors prepared to emit in the near UV are well known. These have been used widely, for example, in lamps for photochemical reactions, trapping and diazo light-sensing. As their applications have increased of late, it is desirable to further improve the characteristics of such phosphors.

It is the principal object of the invention to provide a phosphor having a large light output when used in a fluorescent lamp, and a small lowering of light output upon lighting.

SUMMARY OF THE INVENTION

The present invention provides a novel phosphor having a very high light output in a fluorescent lamp, and a very small lowering of light output upon light production. The phosphor comprises a yttrium orthophosphate phosphor, a luminescence source in the near UV, represented by the general formula:

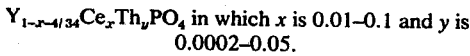

The invention further provides a process for producing the above phosphor which basically comprises firing at least one phosphate yielding compound, such as orthophosphoric acid or an orthosphosphate, along with an oxide of thorium, yttrium and cerium. Firing is in a reducing atmosphere. Further, the above orthophosphate yielding materials can be utilized in an aqueous solution containing metallic thorium, yttrium and cerium ions to react, thereby forming a precipitate. The precipitate can be dried and fired in a reducing atmosphere, thereby yielding the unique phosphor of the present invention.

The phosphor of the invention is a yttrium orthophosphate phosphor which is a luminescence source in the near UV represented by the general formula:

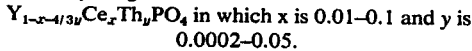

The phosphor of the invention has such a very excellent character that, when used in a fluorescent lamp, its light output is particularly large as compared with known typical phosphors, and the light output lowering during lighting is markedly small.

A cerium-activated yttrium orthophosphate phosphor is reported by R. C. Ropp in the Journal of the Electrochemical Society, Vol. 115, No. 5, May, 1968. There is reported therein a luminescent intensity which is only half, or less, that of the commonly used lead-activated barium disilicate phosphor ($BaSi_2O_5 : Pb$), when excited under the same condition, i.e., by radiation of 253.7 millimicrons with a low pressure mercury discharge.

We the inventors have found that when a phosphor is synthesized by adding thorium as an activator to yttrium orthophosphate: cerium, a phosphor which gives a luminescent intensity of 1.5 times or more greater than that of the barium disilicate: lead phosphor results, and this is without changing the form of its luminescent spectrum.

Figure 1:
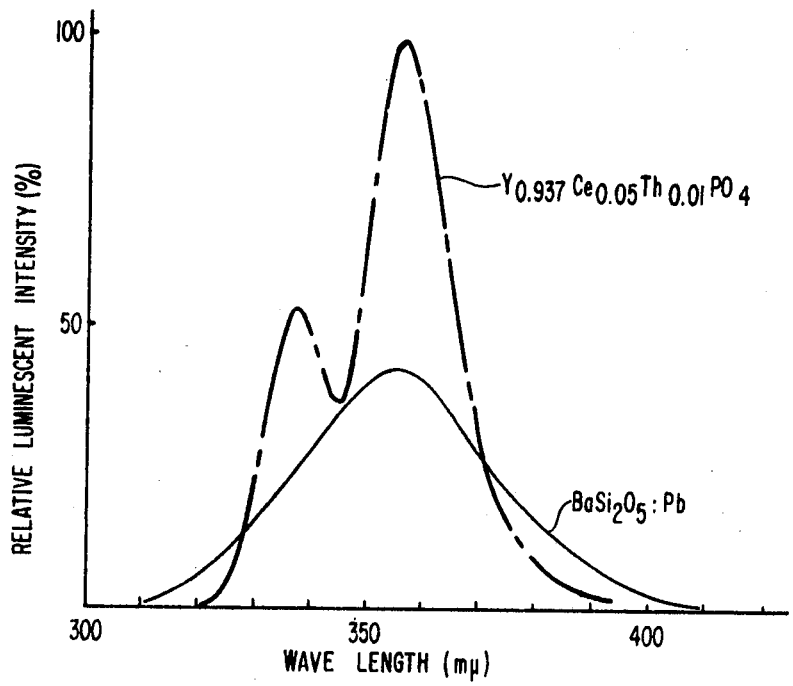
FIG. 1 is a plot of the relationship between the amount of added thorium and the luminescent intensity of the phosphor of the invention.
Figure 2:
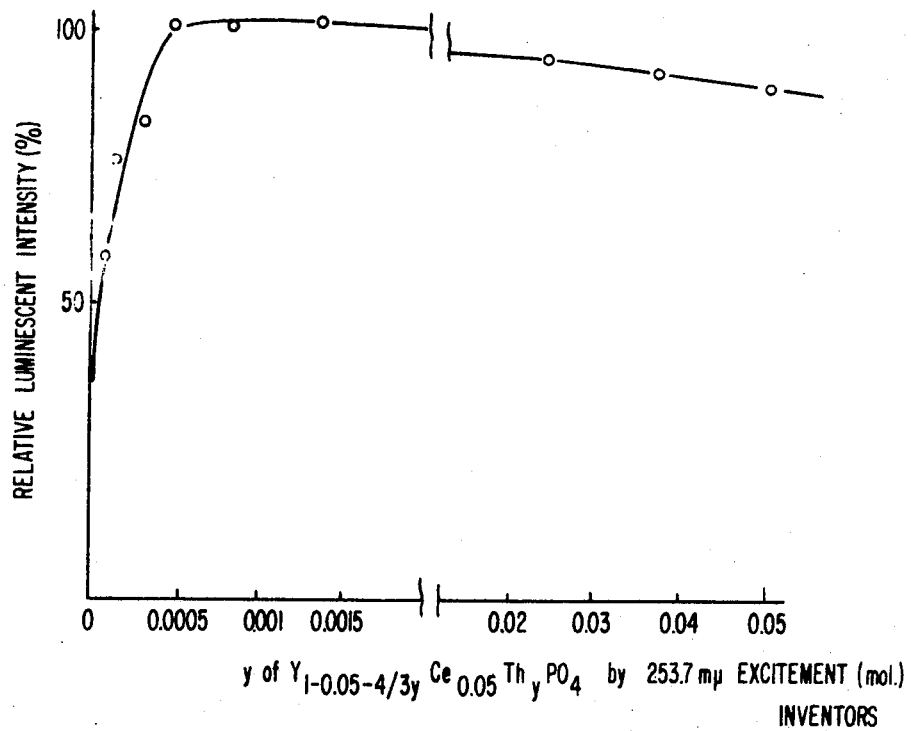
FIG. 2 is a plot comparing the intensity distribution of the emission spectra of a known phosphor and the phosphor of the present invention.

The present invention will be illustrated with reference to the accompanying drawing in which FIG. 1 is a graph showing the relation of the added amount of thorium and the luminescent intensity in the phosphor of the invention; and FIG. 2 is a graph comparing the intensity distribution of the emission spectra of a known typical phosphor and the phosphor of the invention.

The phosphor of the invention is a phosphor consisting of yttrium orthophosphate as a matrix activated with cerium and thorium, which is obtained by mixing predetermined amounts of orthophosphoric acid or orthophosphate with oxides of thorium, yttrium and cerium, or inorganic compounds of these metals capable of conversion to the corresponding oxides by heating, for example, nitrates, acetates and oxalates, and then firing the mixture in a reducing atmosphere. As the phosphorus compounds are generally used $H_3PO_4$, $P_2O_5$ and orthophosphates capable of conversion to, or yielding, $P_2O_5$ by heating or firing, such as $(NH_4)_2PO_4$. The reaction is carried out while the reactants are dried and powdered. As the reducing atmosphere, a mixed gas of $N_2$ and $H_2$ is preferably used. The gas mixing ratio is not particularly limited, but ordinarily is in a range of 2–30 percent by volume, in particular, 5–10 percent by volume of $H_2$. In addition, $NH_3$ and CO may also be used as the reducing gas. The mixing ratio in this case is similar to that in the case of using $H_2$. The amounts of the compounds used per 1 mol of orthophosphoric acid or orthophosphate are 0.01–0.1 mol ($x$) of cerium, 0.0002–0.05 mol ($y$) of thorium and $1-x-4/3\cdot y$ mol of yttrium, in which 4 and 3 represent, respectively, the electric charge of $y$, $4^+$ and $3^+$. When the amount of a cerium compound used is outside the above-mentioned range, the effect thereof as an activator, in particular, in respect of the emission output, is not so remarkable.

FIG. 1 shows the relation of the addition amount of thorium (mol) and the relative luminescent intensity when a phosphor containing 0.5 mol of cerium is excited by radiation of 253.7 millimicrons. As is evident from this graph, a marked effect is found from 0.0002 mol of thorium, and the curve is saturated at a high luminescent intensity within a range of 0.0005 mol to 0.05 mol. The curve lowers gradually with further increase of the amount of thorium to such an extent that the phosphor is not put to practical use (in respect of the luminescent intensity). Although the foregoing result is based upon a test using a phosphor containing 0.05 mol of cerium, substantially similar results are obtained even in tests of about 0.01 mol and 0.1 mol within a range of 0.01–0.1 mol. The added amount of yttrium depends on the amounts of cerium and thorium added.

Firing is preferably carried out at a temperature of from 1,200° to 1,300° C., but this temperature is not so severely restricted. When the firing temperature is too low, the reaction is not sufficient, while a high temperature results in, unfavorably, sintering of the phosphor itself and reaction with the material of the crucible. The firing time is relatively short at a high firing temperature and long at a low temperature, of course, depending on the amount of a phosphor to be fired. 0.5–5 hours is preferred.

The completion of the reaction can be determined by crystal analysis using X-rays and by measurement of the characteristics of the phosphor. However, it is ordinarily judged empirically by the hardness of the sintered powder. When the reaction is insufficient, the sintered powder is soft, and when the reaction has proceeded to excess, it is very hard.

The foregoing process for preparing the phosphor of the invention is carried out by a dry process, but, as occasion demands, it may be carried out by a wet process. That is to say, metal ions of thorium, yttrium and cerium present in aqueous solution, as a nitrate for instance, can be caused to react with orthophosphoric acid and to thus precipitate the phosphor of the invention. In this case, an orthophosphate such as ammonium monohydrogen phosphate may be used, resulting often in a colloidal precipitate which is hard to handle. Any yttrium compound and cerium compound may be used herein if capable of forming metal ions in aqueous solution. Orthophosphoric acid : thorium compound : yttrium compound : cerium compound molar ratio is one mol up :

0.002:1.00:0.06 and pure water to approximately four liters is one such solution. The reaction solution is heated to about 80° C. (non-critical), with agitation, to give a precipitate, dried and then fired in a reducing atmosphere to obtain the phosphor of the invention.

The addition of other rare earth elements such as lanthanum and gadolinium to the yttrium orthophosphate : cerium : thorium phosphor of the present invention scarcely affects its characteristics as long as the content of such rare earth elements is 5–6 percent or less of the total quantity of the phosphor. This has been confirmed.

It can now be assumed, from various optical measurements, that the thorium added plays the role of a so-called sensitizer, increasing the energy absorption to radiation of 253.7 millimicrons and transmitting the energy in high efficiency during the emitting step of cerium. Further, the thorium stabilizes the presence of $Ce^{+3}$ necessary as an activator in the phosphor and suppresses the formation of $Ce^{+4}$, which occurs often in the synthesis reaction of the phosphor. There is no change in the crystal structure of the yttrium orthophosphate : cerium phosphor even by the addition of thorium, X-ray diffraction showing that the xenotime structure of yttrium orthophosphate is held.

The following examples are given in order to illustrate the invention in detail without limiting the same.

EXAMPLE 1

0.937 mol of yttrium oxide ($Y_2O_3$), 0.05 mol of cerium nitrate ($Ce(NO_3)_3 \cdot 6H_2O$), 0.01 mol of thorium nitrate ($Th(NO_3)_4 b \cdot 4H_2O$) and 2 mols of ammonium monohydrogen phosphate (($NH_4)_2HPO_4$) were respectively weighted, mixed with water in an evaporating dish to form a slurry, dried at 200° C. and then pulverized. The thus resulting mixture was charged in a silica crucible, heated at 800° C. for 30 minutes in the air, pulverized again, charged similarly in a silica crucible and then fired at 1,300° C. for one hour in a mixed gaseous stream of nitrogen and hydrogen in a proportion by volume of 95 : 5 to obtain a phosphor. The flow rate is not important as long as the gas has a reducing capability.

The thus obtained phosphor of the invention showed a light output about 1.5 times as much as the known barium disilicate : lead phosphor under radiation of 253.7 millimicrons from a low pressure mercury discharge, as shown in FIG. 2. A material used for comparison was the barium disilicate phosphor marketed and practically used for the fluorescent lamp. In the graph, its luminescent intensity is shown at its highest level.

The light output and the changes thereof during the lighting of 20 W fluorescent lamps made by coating the phosphor of this example onto a bulb (in a conventional manner) and by using the above-mentioned barium disilicate phosphor were measured for comparison, thus obtaining the following results.

| Sample | Just after evacuating | Light Output After 100 hr lighting | After 500 hr lighting |
|---|---|---|---|
| 20 W lamp using the phosphor of the present invention | 266(100) | 274(96) | 263(92) |
| 20 W lamp using barium disilicate phosphor phosphor | 172(100) | 146(85) | 122(71) |

In this table, the numbers in parentheses represent the light output after lighting for a predetermined period of time when the light output immediately after evacuating is 100, from which the lowering rate of the light output is apparent. For measurement of the light output, a photoelectric amplifying tube 931A (R.C.A. Standard) with UVD–1 filter (manufactured by Tokyo Shibaura Electric Co., Ltd.) was used by which only the near UV at a wavelength range of 310–390 millimicrons was measured.

EXAMPLE 2

275 g. (about 1 mol) of yttrium nitrate ($Y(NO_3)_3$), 20 g. (0.06 mol) of cerium nitrate ($Ce(NO_3)_3$) and 0.5 g. (0.002 mol) of thorium nitrate ($Th(NO_3)_3$) were dissolved in pure water to approximately 2 l. and heated at about 80° C. for the ease of precipitating and filtering operations. 230 ml. (about 300 g.) of 85 percent aqueous solution of orthophosphoric acid $H_3PO_4$ (density: about 1.67) diluted with water to 2 l. was gradually added thereto. The solution was heated, with agitation, and, after 10–20 minutes, filtered, followed by drying the resulting precipitate. The excess phosphoric acid remained in the filtrate. The precipitated $Y_{1-x-4/3y}Ce_xTh_yPO_4$ was dried and fired in the same manner as in Example 1 to thus obtain a phosphor.

It will be understood from the foregoing detailed explanation and examples that the yttrium orthophosphate : thorium phosphor according to the invention has more excellent characteristics such as a high light output and a remarkable low decay of the light output during lighting compared to known best phosphors.

What is claimed is:

1. A yttrium orthophosphate phosphor represented by the general formula, $$Y_{1-x-4/3y}Ce_xTh_yPO_4$$

in which $x$ is 0.01–0.1 and $y$ is 0.0002–0.05.

2. A process for the production of the yttrium orthophosphate phosphor represented by the general formula $Y_{1-x-4/3y}Ce_xTh_yPO_4$, wherein $x$ is 0.01–0.1 and $y$ is 0.0002–0.05, which comprises firing at least one compound selected from the class consisting of ammonium monohydrogen phosphate and phosphoric acid with a member selected from the class consisting of yttrium oxide and yttrium nitrate, cerium nitrate and thorium nitrate in a reducing atmosphere.

3. The process of claim 2 wherein said oxide is obtained by heating inorganic compounds.

4. The process of claim 2 wherein said oxide is obtained by heating at least one compound selected from the class consisting of nitrates, acetates and oxalates.

5. The process of claim 2, wherein said firing is carried out at a temperature of 1,200°–1,300° C.

6. A process for the production of the yttrium orthophosphate phosphor represented by the general formula, $Y_{1-x-4/3y}Ce_xTh_yPO_4$ wherein $x$ is 0.01–0.1 and $y$ is 0.0002–0.05, which comprises adding a compound selected from the class consisting of ammonium monohydrogen phosphate and phosphoric acid to an aqueous solution containing thorium nitrate, a member selected from the class consisting of yttrium oxide and yttrium nitrate, and cerium nitrate, reacting to form a precipitate, drying said precipitate and then firing said precipitate in a reducing atmosphere.

7. The process of claim 6 wherein said firing is carried out at a temperature of 1,200°–1,300° C.

* * * * *